United States Patent [19]

Hsu et al.

[11] Patent Number: 5,616,419
[45] Date of Patent: Apr. 1, 1997

[54] METHOD OF PRODUCING COATING ON RECONSTITUTED WOOD SUBSTRATE

[75] Inventors: Oscar Hsien-Hsiang Hsu, Lansdale, Pa.; Gerard M. Currier, High Point, N.C.; Philip H. Moes, Brandon, Miss.

[73] Assignees: Rohm and Haas Company, Philadelphia, Pa.; Akzo Nobel Inc., Louisville, Ky.

[21] Appl. No.: 635,134

[22] Filed: Apr. 19, 1996

Related U.S. Application Data

[62] Division of Ser. No. 474,034, Jun. 7, 1995.

[51] Int. Cl.$^6$ .................................................. B32B 21/02
[52] U.S. Cl. ........................ 428/512; 428/513; 428/514
[58] Field of Search ............................. 428/511, 512, 428/513, 514

[56] References Cited

U.S. PATENT DOCUMENTS

| | | | |
|---|---|---|---|
| 3,098,785 | 7/1963 | Meiler | 162/11 |
| 3,607,341 | 9/1971 | Goins et al. | 117/10 |
| 3,790,421 | 2/1974 | Habgood, Jr. | 156/242 |
| 3,804,700 | 4/1974 | Hoey | 161/160 |
| 3,901,240 | 8/1975 | Hoey | 128/296 |
| 3,919,451 | 11/1975 | Levy et al. | 428/310 |
| 3,933,691 | 1/1976 | Lindemann | 260/2.5 L |
| 3,957,940 | 5/1976 | Schubert et al. | 264/171 |
| 3,961,118 | 6/1976 | Michaelis | 428/151 |
| 4,061,822 | 12/1977 | Brodnyan et al. | 428/315 |
| 4,238,438 | 12/1980 | Laughinghouse et al. | 264/119 |
| 4,265,965 | 5/1981 | Chancler | 428/315 |
| 4,289,823 | 9/1981 | Arkens | 428/245 |
| 4,325,856 | 4/1982 | Ishikawa | 523/201 |
| 4,376,142 | 3/1983 | Allen | 427/393 |
| 4,384,096 | 5/1983 | Sonnabend | 526/313 |
| 4,385,152 | 5/1983 | Boyack et al. | 524/460 |
| 4,403,003 | 9/1983 | Backhouse | 427/407.1 |
| 4,510,268 | 4/1985 | Tonokawa et al. | 521/146 |
| 4,517,228 | 5/1985 | Matejka et al. | 427/370 |
| 4,654,397 | 3/1987 | Mall et al. | 524/460 |
| 4,692,473 | 9/1987 | Wright et al. | 521/72 |
| 4,734,231 | 3/1988 | Morita et al. | 264/45.3 |
| 4,814,373 | 3/1989 | Frankel et al. | 524/460 |
| 4,966,170 | 10/1990 | Keritsis et al. | 131/88 |
| 4,999,064 | 3/1991 | Knaepen | 428/512 |
| 5,059,264 | 10/1991 | Sheets | 156/62.2 |
| 5,063,646 | 11/1991 | Zeiffer et al. | 28/167 |
| 5,085,891 | 2/1992 | Evans | 427/277 |
| 5,436,069 | 7/1995 | Winterowd et al. | 428/308.8 |

FOREIGN PATENT DOCUMENTS

| | | |
|---|---|---|
| 2021777 | 1/1991 | Canada . |
| 1653244 | 4/1972 | Germany . |
| 9081510 | 8/1974 | Japan . |
| 2096636 | 8/1977 | Japan . |
| 8020435 | 2/1983 | Japan . |
| 3136806 | 6/1991 | Japan . |
| 3267174 | 11/1991 | Japan . |
| 5117629 | 5/1993 | Japan . |
| 1387484 | 3/1975 | United Kingdom . |
| 9315888 | 8/1993 | WIPO . |

OTHER PUBLICATIONS

The Characterization of Polymers, Ch. 1 (published by Rohm and Haas Company, Philadelphia, PA, 1976).

*Primary Examiner*—Michael Lusignan
*Assistant Examiner*—Erma Cameron
*Attorney, Agent, or Firm*—Sudhir G. Deshmukh; Loretta A. Miraglia

[57] ABSTRACT

The present invention is directed to producing a smooth hard coating on a wood substrate. A layer of a foamed polymerized latex emulsion is applied on the surface of a wood substrate, such as an oriented strand board. The layer is dried, crushed and then cured to form the orating. If desired the cured coating may be provided with a post cure heat treatment to improve its hardness. The present invention is also directed to applying and drying the layer of the foamed polymerized latex emulsion on a mat of wood fibers or flakes and then crushing and curing the crushed layer and the mat into a hardboard having a smooth hard coating. The coating of the present invention is useful as a sealer coat on a wood substrate. By adding pigment to polymerized emulsion, the sealer coat can be used to provide a finish coat on the wood substrate.

7 Claims, No Drawings

METHOD OF PRODUCING COATING ON RECONSTITUTED WOOD SUBSTRATE

This is a divisional of application Ser. No. 08/474,034, filed Jun. 7, 1995.

This invention generally relates to a method of producing coated wood substrates and more particularly to producing reconstituted wood substrates having a sealer coating thereon.

Reconstituted wood substrate (RWS) means, substrates produced from wood particles, fibers, flakes or chips, such as, a hardboard, a medium density fiberboard, an oriented strand board also known as wafer board, a flake board, a chipboard and a particleboard. Such a RWS is typically fabricated under heat and pressure from particles, fibers, flakes or chips. RWS is produced by treating particles, flakes, chips or fibers with a binder and then arranging these treated particles, flakes, chips or fibers in the form of a mat under dry or wet conditions. The mat is then compressed into a dense substrate, typically in a sheet form, by the application of heat and pressure. The binder binds particles, flakes, chips or fibers and enhances the structural strength and integrity of the RWS and its water resistance. The RWS, if desired, may be molded into desired shape or provided with a textured surface, such as, wood grain texture.

Reconstituted wood substrates tend to have rough and sometimes pitted uneven surfaces. Secondary operations, such as, cementing paper overlays or applying multilayer coatings on such rough surfaces have been attempted. However, such paper overlays or multilayer coatings still tend to be uneven. The present invention solves these problems by providing a process that produces smooth hard coating adhered to RWS.

One of the methods for producing a foamed, dried, crushed and cured layer of a latex composition has been described by Goins in U.S. Pat. No. 3,607,341. Goins discloses a method for producing a soft, pliable crushed foam backing on textile fabrics by foaming, applying, drying, crushing and curing a layer of a latex composition consisting essentially of water, ethylenically unsaturated monomers and a water soluble organic surfactant on the surface of a textile fabric to produce a backing having a density of 30 to 65 pounds per cubic feet (0.48 to 1.04 grams per milliliters). One of the problems associated with such a method is that the resultant soft coating is unsuitable as a coating on the surface of a RWS. The present invention solves this problem by producing smooth hard coating adhered to RWS.

Another problem associated with RWS is that its surfaces tend to have different degrees of absorbency, which it is believed, without reliance thereon, to result from the variation in RWS density across the RWS surface. It is believed that such a density variation results during the manufacture of RWS or is due to variations typically present in the quality of wood chips, particles, flakes or fibers used in producing RWS. As a result, such RWS when coated with a sealer coating tends to be blotchy. The method of the present invention solves this problem by producing smooth hard coating adhere d to RWS that is free from blotches.

The present invention is directed to a method of producing a coating on the surface of a reconstituted wood substrate comprising:

foaming a polymerized latex emulsion comprising polymer particles of a polymer of an ethylenically unsaturated monomer, the polymer having $T_g$ in the range of 10° C. to 100° C., and a foaming agent;

applying a layer of the foamed polymerized latex emulsion on the surface of the substrate;

drying the foamed layer into a hardened layer;

crushing the hardened layer; and curing the crushed layer to form the coating on the wood substrate.

The present invention is also directed to a method of producing a coated reconstituted wood substrate comprising:

mixing a binder with wood particles, chips, fibers or flakes to form a wood/binder mix;

dispensing the wood/binder mix on a conveying surface to produce a mat;

foaming a polymerized latex emulsion comprising polymer particles of a polymer of an ethylenically unsaturated monomer, the polymer having $T_g$ in the range of 10° C. to 100° C., a foaming agent and a foam stabilizer in the range of 0 to 15 percent by weight of the emulsion solids;

applying a foamed layer of the foamed polymerized latex emulsion on the surface of the mat;

drying the foamed layer into a hardened layer;

crushing the hardened layer; and curing the crushed layer and the mat into the coated reconstituted wood substrate.

The present invention is further directed to a polymerized latex emulsion suitable for producing a smooth hard coating on the surface or edge of a reconstituted wood substrate comprising: from 10 percent to 60 percent by weight of the emulsion solids of polymer particles of a polymer of an ethylenically unsaturated monomer, the polymer having $T_g$ in the range of 10° C. to 100° C., a foaming agent, and from 0 percent to 15 percent by weight of the emulsion solids of a foam stabilizer selected from the group consisting of disodium N-octadecylsulfosuccinate, tetrasodium N-(1,2-dicarboxyethyl)-N-octadecylsulfosuccinate, sulfosuccinimate surfactant, diamyl ester of sodium sulfosuccinic acid, dihexyl ester of sodium sulfosuccinic acid, dioctyl ester of sodium sulfosuccinic acid, distearyl pyridinium chloride, N-coco-beta-aminopropionic acid and the sodium salts thereof.

The present invention is further directed to RWS surface coated in accordance with the method of the present invention.

The present invention is further directed to a coating on the surface of RWS.

The coatings produced by the processes of the present invention are smooth and hardened and they are substantially free from cracks, voids and porosity. It is contemplated that smooth and hard coatings may be provided with a texture or may be applied over shaped or molded RWS.

As used herein:

"Surface or Surfaces" include any exposed surface, edge or edged surface of RWS.

"Polymerized latex emulsion" means an aqueous colloidal dispersion of polymer particles.

"Emulsion solids" means weight of the polymer particles in their dry state.

"Medium density fiberboard" means a board manufactured from lignocellulosic fibers bonded under heat and pressure by means of a well dispersed synthetic resin or a similar binder. Such a board is manufactured to a specific gravity of 0.50 to 0.88.

"Oriented strand board (OSB)" means a board manufactured from lignocellulosic strand-type flakes purposefully aligned in a direction that makes the resultant board stronger, stiffer and having improved dimensional properties in the direction of alignment when compared to a board having random flake orientation. OSB is also known as wafer board.

"Particle board" means a board manufactured from wood particles bonded under heat and pressure by means of a well dispersed synthetic resin or similar binder. Such a board includes conventional extruded and mat-formed particle boards.

"Flake board" means a board manufactured from wood flakes bonded under heat and pressure by means of a well dispersed synthetic resin or similar binder.

"Plywood" means a glued wood panel made up of relatively thin layers of veneer with the grain of adjacent layers at right angles or a panel made up of veneer in combination with a core of lumber or of RWS.

"Underlayment" means a smooth flat RWS used as a floor panel upon which resilient floor covering may be glued.

"Add-on" means grams of the solid portion of a polymerized latex emulsion (dry portion) coated over a meter square area of the surface of the substrate.

"B" stage curing means partial curing of a polymerized latex emulsion.

The basic process for the preparation of RWS from wood chips, flakes, particles or fibers is known in the art. (generally, this process is disclosed in U.S. Pat. Nos. 3,098,785 and 4,238,438.

The first step of the first embodiment of the present invention directed to producing a coating on the surface of a RWS comprises foaming a polymerized latex emulsion having a foam density in the range of 0.04 to 0.25, preferably from 0.06 to 0.15 grams per milliliters. The foam density is controlled by adjusting the ratio of the polymerized latex emulsion to a non-reacting gaseous foam conveying medium, such as air, nitrogen, helium or carbon dioxide. Air is preferred. The foamed polymerized latex emulsion is provided with a viscosity in the range of 25 to 1200 centipoise (cps), preferably in the range of 50 to 800 cps. The viscosity is controlled by adjusting the amount of water present in the polymerized latex emulsion, by addition of suitable rheology modifiers, such as, RM-825® rheology modifier supplied by Rohm and Haas Company, Philadelphia, Pa. or by doing both. Viscosities in excess of the upper limit of 1200 cps, are difficult to foam and those with viscosities less than 25 cps are difficult to maintain in a foamed state.

Conventional foaming devices, such as, the Texacote Foamer, supplied by Textile Rubber and Chemical Co., Dalton, Ga. are suitable since such devices utilize air or gas whipping action to produce a foam of fine uniform bubble structure. Suitable gases include nonreactive gases, such as, carbon dioxide and nitrogen. Foam produced by air whipping is preferred. The foaming step is preferably carried out at room temperature.

The polymerized latex emulsion used in the foaming step of the first embodiment includes from 10 percent to 60 percent, preferably from 20 percent to 50 percent and most preferably from 35 percent to 45 percent of polymer particles, all percentages being in weight percentages based on the total weight of the emulsion.

The polymer particles have a particle size in the range of 50 to 500 nanometers, preferably in the range of 70 to 250 nanometers.

The polymer particles are produced from latex polymers having a glass transition temperature ($T_g$) in the range of 10° C. to 100° C. (as measured at mid-point range using conventional differential scanning calorimetry), preferably in the range of 20° C. to 60° C. Such polymers are preferably copolymers of at least one ethylenically unsaturated monomer, such as, for example, acrylic ester monomers including methyl acrylate, ethyl acrylate, butyl acrylate, 2-ethylhexyl acrylate, decyl acrylate, methyl methacrylate, butyl methacrylate, lauryl (meth)acrylate, isobornyl (meth)acrylate, isodecyl (meth)acrylate, oleyl (meth)acrylate, palmityl (meth)acrylate, stearyl (meth)acrylate, hydroxymethyl (meth)acrylate, hydroxyethyl (meth)acrylate, and hydroxypropyl (meth)acrylate; acrylamide or substituted acrylamides; styrene or substituted styrenes; butadiene; vinyl acetate or other vinyl esters; vinyl monomers, such as, for example, vinyl chloride, vinylidene chloride, N-vinyl pyrrolidone; amino monomers, such as, for example, N,N'-dimethylamino (meth)acrylate; and acrylonitrile or methacrylonitrile. Additionally copolymerizable ethylenically-unsaturated acid monomers in the range of, for example, front 0.1 percent to 7 percent, by weight based on the weight of the emulsion-polymerized polymer, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1propanesulfonic acid, sodium vinyl sulfonate, and phosphoethyl methacrylate, may be used.

The polymer used in this invention can be a substantially thermoplastic or substantially uncrosslinked polymer when applied to the substrate. If desired, premature crosslinking or gelling of the polymer is induced by adding to the monomer mix multi-ethylenically unsaturated monomers in the range of 0.01% to 5%, by weight based on the weight of the polymer. Typical multi-ethylenically unsaturated monomers include allyl methacrylate, trimethylolpropane triacrylate, diallyl phthalate, 1,4-butylene glycol dimethacrylate, 1,6-hexanedioldiacrylate and divinyl benzene. It is important, however, that the quality of the film formation is not materially impaired.

The sealer coating produced from latex polymers having the $T_g$ in range of 10° C. to 100° C. are hard with substantially no regain in the thickness of the coating applied over RWS.

The polymerization techniques used to prepare such latex polymer particles are well known in the art. The polymer particles are preferably prepared by emulsion polymerization.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05% to 3.0% by weight, based on the weight of total monomer, may be used.

Chain transfer agents, such as, for example, mercaptans may be used in an amount effective to provide a GPC weight average molecular weight of 10,000 to 1,000,000. "GPC weight average molecular weight" means the weight average molecular weight determined by gel permeation chromatography (GPC) described on page 4, Chapter I of The Characterization of Polymers published by Rohm and Haas Company, Philadelphia, Pa. in 1976, utilizing polymethyl methacrylate as the standard.

The size of the polymer particles is controlled by the amount of conventional surfactants added during the polymerization process. It is known in the art that by increasing the amount of surfactant added during polymerization, the diameter of the polymer particles can be reduced and by reducing the amount of surfactant, one can increase the diameter of the polymer particles. Conventional surfactants include anionic, nonionic emulsifiers or their combination.

Anionic emulsifier is preferred. Typical anionic emulsifiers include alkali or ammonium alkyl sulfates, alkyl sulfonic acids, fatty acids, and oxyethylated alkyl phenols. Sodium lauryl sulfate is preferred. Typical nonionic emulsifiers include polyoxyethylenated alkylphenols, alkylphenol ethoxylates, polyoxyethylenated straight-chain alcohol, amine polyglycol condensate, modified polyethoxy adducts, long chain carboxylic acid esters, modified terminated alkylaryl ether, and alkylpolyether alcohols.

Alternatively, the polymer particles include multi-stage latex polymers provided with two or more phases of various geometric structures, such as, for example, core/shell or core/sheath particles, core/shell particles with shell phases incompletely encapsulating the core, core/shell particles with a multiplicity of cores and interpenetrating network particles. In all of these cases the majority of the surface area of the particle will be occupied by at least one outer phase and the interior of the latex polymer particle will be occupied by at least one inner phase. The outer phase of the multi-stage polymer particles weighs 5 percent to 95 percent, by weight based on the total weight of the particle and is preferably softer than the inner phase.

The multi-stage polymer particles are prepared preferably by a conventional emulsion polymerization process in which at least two stages differing in composition are formed in a sequential fashion. Such a process usually results in the formation of at least two mutually incompatible polymer compositions, thereby resulting in the formation of at least two phases. Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The polymerized latex emulsion further contains from 1 to 15 percent, preferably from 5 to 10 percent, by weight of the emulsion solids of a foaming agent. Some of the suitable foaming agents include alkali metal, ammonium and amine salts of fatty acids, such as, aliphatic or mixtures of aliphatic carboxylic acids, or the mixtures thereof. Examples of preferred aliphatic carboxylic acids include stearic acid, tallow fatty acids and oleic acid. Particularly preferred are salts or soaps of stearic acid or of partially or fully hydrogenated fatty acids of natural origin containing stearic acid, such as, hydrogenated tallow acid, hydrogenated tall oil fatty acids, hydrogenated soy bean oil fatty acids, and hydrogenated tung acids. More preferred water-soluble salts or soaps of these acids are the alkali metal, usually sodium or potassium salt, the ammonium salts and the amine salts, such as, alkanolamine salts, e.g., mono-, di- and triethanolamine salts. Ammonium stearate is most preferred.

The polymerized latex emulsion further contains from 0 to 15 percent, preferably front 0.1 to 15 percent, more preferably 5 to 7 percent, by weight of the emulsion solids of a foam stabilizer. Suitable foam stabilizers include anionic and nonionic surfactants, such as, sulfosuccinate ester salts, such as, disodium N-octadecylsulfosuccinate, tetrasodium N-(1,2-dicarboxyethyl)-N-octadecylsulfosuccinate, sulfosuccinimate surfactant diamyl ester of sodium sulfosuccinic acid, dihexyl ester of sodium sulfosuccinic acid, dioctyl ester of sodium sulfosuccinic acid. Additional foam stabilizers include cationic or an amphoteric surfactants, such as, distearyl pyridinium chloride, N-coco-beta-aminopropionic acid or the sodium salts thereof. Calcium succinimate is preferred.

If desired, the foam stability of the foamed layer may be achieved by increasing the $T_g$ of a latex polymer without the addition of the foam stabilizer in the polymerized latex emulsion. If the amount of either the foaming agent or the stabilizer added to the emulsion exceeds 15 percent by weight of the emulsion, the water sensitivity of the resultant coating is adversely affected.

The polymerized latex emulsion optionally includes from 0 to 40 percent, preferably from 0.5 to 40 percent, more preferably from 10 to 20 percent, by weight of the emulsion solids of a crosslinking agent. Some of the suitable cross linking agents include polyisocyanate cross linkers, such as, toluene diisocyanate, diphenylmethane diisocyanate; carbodiimide cross linkers; epoxy resins, such as those obtained from bis-phenol A and epichlorohydrin; organic peroxides, such as, benzoyl peroxide; aminoplast resins containing a nucleus or nuclei of acetoguanamine, benzoguanamine, adipoguanamine, or preferably of melamine. Some of the suitable aminoplast resins include methylol urea, dimethoxymethylol urea, butylated polymeric urea-formaldehyde resins, hexamethoxymethyhnelamine, methylated polymeric melamine formaldehyde resin, glycouril and dimethylol-dihydroxyl ethylene urea. Hexamethoxymethylmelamine is preferred. The aminoplast resin is considered to be fully alkylated, or substantially completely methylolated and subsequently substantially fully etherified with alcohol, with the number of alkyloxymethyl groups ranging from 2n-2 to 2n where n is the number of amino groups on the triazine ring. The preferred degree of polymerization of this aminoplast is front 1 to 3. The amount of cross linking agent added to the polymerized latex emulsion depends upon the degree of hardness and cross linking density desired in a resultant coating. It has been discovered that the presence of the crosslinking agent in the polymerized latex emulsion improves toughness of the resultant coating. However, adding in excess of 40 percent of the cross linking agent is not recommended since it results in poor adhesion, blistering and instability of the resultant coating on the RWS substrate surface.

If desired, the polymerized latex emulsion further includes from 0 to 10 percent, preferably from 1 to 5 percent, by weight of the emulsion solids of a wetting agent, such as, for example, $C_{12}$ to $C_{18}$ primary, secondary and tertiary amines and salts thereof, diamines, polyamines and their salts, quaternary ammonium salts, polyoxyethylenate amines, quaternized polyoxyethylenate amines or amine oxides. The purpose of the wetting agent is to enhance the surface wetting of the underlying substrate, especially for difficult to wet surfaces, such as, greasy, dirty or waxy surfaces. The wetting agent allows uniform and substantially complete contacting of the foamed layer to the underlying RWS surface.

If desired, the polymerized latex emulsion further includes from 0.1 to 2 percent, preferably from 0.2 to 0.8 percent, by weight of the emulsion solids of a homogenizing agent. Suitable homogenizing agents include non-ionic surfactants, such as, preferably, TRITON® X-405 octyl phenoxy polyethoxy ethanol supplied by Union Carbide Co., Charleston, W.Va. The purpose of the homogenizing agent is to enhance the uniform and homogeneous dispersion of the various components of the polymerized latex emulsion, especially for attaining uniform color dispersion of a pigmented polymerized latex emulsion.

Depending upon the intended use of the coating, additional components may be added to the polymerized latex emulsion. These additional components include but are not limited to pigments; pigment extenders; plasticizers; cosolvents; rheology modifiers; fillers, such as, talc; preservatives and freeze/thaw protectors. More particularly preferred filler is talc in platelet form, such as that described in U.S. Pat. No. 4,517,228.

The next step of the first method of the present invention is directed to applying a layer of a desired thickness of the foamed latex emulsion on the surface or edge of a RWS by conventional means, such as, a curtain coater, spray nozzle, roller coater, flow coater or by extrusion, which is particularly useful for coating edges. The foamed layer may be leveled to a desired thickness by such conventional means as a doctor blade to meet the desired requirements of the resultant coating, such as a sealer coating. Foamed layer in the range of 0.8 mm to 10 mm, preferably in the range of 2 to 5 mm is desirable. The present invention contemplates applying the foamed layer on more than one side of the RWS, such as, front and back or along the edges of a substantially planar RWS or on the surface of a contoured RWS, such as, a molding or molded door panel. It is further contemplated that the foamed layer is applied on a continuously moving RWS or on a precut RWS as part of a batch operation.

The foamed latex layer is then dried into a hardened foamed layer by reducing the moisture content of the foamed latex layer in the range of 0 to 20 percent by weight of the emulsion solids. The "hardened layer" means a foamed layer that does not collapse by itself and feels rigid to digital pressure. Conventional drying methods, such as, preferably by conveying dry heated air over the foamed layer, or by subjecting the foamed layer to infrared heating, are suitable. An applicable drying temperature and drying time is suitably adjusted for the polymerized latex emulsion being used and the thickness of the applied layer. The applicable drying temperature typically varies from 40° C. to 180° C. However, if desired, drying may be conducted at ambient temperatures. The drying time is correspondingly reduced for higher applicable drying temperatures and extended for lower applicable drying temperatures. For example, the foamed layer is dried for a duration varying from 6 hours to 30 seconds, preferably from 5 to 10 minutes at 121° C. or from 2 to 4 minutes at 150° C. Conventional drying means, such as, a convection air drying oven or a conveyer belt passing through a tunnel heated by infrared lights, are suitable.

The dry hardened foamed layer on the surface of the RWS is then crushed at an applicable crushing pressure suitable for the polymerized latex emulsion being used. Conventional crushing means, such as, pneumatically or hydraulically pressurized platens, or by squeezing the RWS through, a pair of nip rollers, series of nip rollers or a pair of parallely positioned conveyer belts, may be utilized to uniformly crush the dry hardened foamed layer. The applicable crushing pressure should be sufficient to substantially crush the hardened foamed layer, which is typically in the range of 0.1 to 3.5 Newton per square millimeters ($N/mm^2$), preferably in the range of 0.14 to 2.0 $N/mm^2$. Optionally the crushing step is simultaneously conducted under an applicable crushing temperature suitable for the polymerized latex emulsion being used. The applicable crushing temperature generally varies front 24° C. to 287° C., preferably from 150° C. to 240° C. If desired, the crushing step may be conducted under freezing conditions, such as, for example, by freezing the dry hardened foamed layer by exposing it to liquid carbon dioxide.

The crushed layer is then cured for an applicable cure time at an applicable cure temperature suitable for the polymerized latex emulsion being used. The applicable cure temperature and time are adjusted to prevent thermal decomposition of the resultant coating or sticking of the coating to the press platens. The applicable cure temperature typically varies from 24° C. to 287° C., preferably from 177° C. to 232° C., and the applicable cure time varies from 120 minutes to 1 to 5 seconds, preferably front 30 minutes to 1 minute. The cure step is conducted preferably simultaneously under an applicable cure pressure suitable for the polymerized latex emulsion being used. The applicable cure pressure varies from 0.1$N/mm^2$ to 3.5$N/mm^2$, preferably from 0.14$N/mm^2$ to 2.0$N/mm^2$. Conventional hot pressing means, such as, a molding press having pneumatically or hydraulically pressurized heated platens is suitable for a batch operation and conventional hot pressing means, such as, a pair of heated calendar rolls, series of heated calendar rolls, a pair of parallely positioned heated conveyer belts, or UV curing lights, may be used for a continuous operation by squeezing the RWS therethrough. The molding press is preferred. If desired the crushing and curing steps may be conducted simultaneously.

The method of the present invention also contemplates curing the crushed layer in gradually increasing or in discretely increasing stages, i.e., the crushed layer is a "B" stage cured at a "B" stage cure temperature suitable for the polymerized latex emulsion being used and then fully cured at the cure temperature. It is believed, without reliance thereon, that by curing the crushed layer in stages, the resultant coating is provided with more flexibility.

The method of the present invention alternatively contemplates curing the crushed layer in gradually increasing or in discreetly increasing stages, i.e., the crushed layer is "B" stage cured at a "B" stage cure temperature and pressure suitable for the polymerized latex emulsion being used and then fully cured at the cure temperature and pressure.

The first step of the second embodiment of the present invention directed to producing a coating on the surface of a RWS comprises mixing a binder with a lignocellulosic material in the form of wood fibers, flakes, particles, or chips to form a wood/binder mix. Flakes are preferred. The lignocellulosic material is thoroughly mixed, by conventional mixing means, such as, a tumble mixer, with from 1 to 10 percent, preferably from 2 to 5 percent, by weight of the lignocellulosic material of the binder. Some of the suitable binders include melamine formaldehyde resin; phenol-formaldehyde resin; urea-formaldehyde resin; isocyanate binders, such as, diphenylmethane diisocyanate; and waxes for improved water repellency of a resulting substrate.

The next step of the method of the second embodiment of the present invention includes dispensing the wood/binder mix on a conveying surface, such as, a conveyer belt, to form a mat, which typically varies from 6.4 mms to 200 mms in thickness. The wood/binder mix is entrained in air, such as an air blower, transported and then dispersed on the conveying surface. The lignocellulosic material in the wood/binder mix may be dispensed in a randomly distributed fashion or it may be oriented to provide structural strength in a desired orientation. A mat having oriented lignocellulosic material used in producing an oriented strand board is preferred.

The polymerized latex emulsion of the present invention is then foamed and applied on the mat surface, dried and hardened by the same steps as those utilized in the method of the first embodiment.

The dried foamed layer of the polymerized latex emulsion is crushed at an applicable mat crushing pressure suitable for the polymerized latex emulsion and the type of underlying mat surface. The applicable mat crushing pressure varies from 0.1$N/mm^2$ to 3.5$N/mm^2$, preferably from 0.14$N/mm^2$ to 2.0N/mm². The crushing step is preferably undertaken by simultaneously applying an applicable mat crushing temperature suitable for the polymerized latex emulsion and the type of underlying mat surface. The applicable mat crushing temperature varies from 24° C. to 287° C., preferably from 150° C. to 204° C.

The crushed foamed layer on the surface of the mat is then cured at an applicable mat cure temperature and an applicable mat cure pressure suitable for the polymerized latex emulsion and the type of underlying mat surface to produce a reconstituted wood substrate having a smooth hardened coating thereon. The applicable mat cure temperature varies from 24° C. to 287° C., preferably from 177° C. to 232° C. The applicable mat cure pressure varies from 0.1 to 3.5N/mm², preferably from 0.14N/mm² to 2.0N/mm². Conventional curing means, such as, a hot mold press, are suitable.

The method of the present invention may further include homogenizing the foam of the polymerized latex emulsion prior to applying it on the surface of the RWS. The homogenizing step is improved by including the homogenizing agent in the polymerized latex emulsion.

The method of the present invention may further include wetting the surface of the RWS to provide substantially uniform contact of the foamed layer to the surface of the RWS during the foam application step by incorporating the wetting agent in the polymerized latex emulsion.

If desired, the method of the present invention further provides for heat treating the cured coating on the RWS to improve the hardness of the coating. The heat treating step is carried out at an applicable postcure temperature, postcure pressure and postcure time suitable for the polymerized latex emulsion and the underlying RWS being used. The applicable postcure temperature varies from 50° C. to 287° C., preferably from 177° C. to 232° C., the applicable postcure pressure varies from 0.1 to 3.5N/mm², preferably from 0.1 to 2.0N/mm², and the applicable postcure time correspondingly varies from 120 minutes to a range varying from 1 to 5 seconds, preferably from 30 to 1.0 minutes.

If desired, the coating of the present invention may be applied over the surfaces of RWS that have been coated with primer coats, such as those known in the art.

The method of the present invention produces a RWS having a smooth hard surface suitable as a durable sealer coating on the surfaces, including the edges, of exterior sidings, interior panelings, interior and exterior door skins also known as door facings, garage door inserts, truss joists, furniture components and floor underlayments. The coating is provided with a surface hardness in the range of 1 to 5 rocker number and a surface roughness in the range of 0.5 to 15 micrometers per 25.4 mms, both measured by the methods described later. It is contemplated that depending upon the use desired, one skilled in the art would vary the thickness of the coating by varying the thickness of the foamed layer. For example, the coating of the present invention may be used as a sealer coat to prevent water penetration of the underlying wood substrate used in water exposed exterior door facings or bath room tiles made from RWS. The RWS coated by the method of the present invention also eliminates the need for applying veneer or paper overlays on the exposed surfaces of reconstituted wood substrates since these substrates tend to have rough surfaces and are esthetically not pleasing. The pigmented version of the polymerized latex emulsion produces a smooth hard opaque or stained coating that eliminates the need for applying additional pigmented finish coats or stains on reconstituted wood substrates.

TESTING PROCEDURES

The following test procedures were used for generating the data reported in the Examples below:

1. Liquid Water Permeability Test

The liquid water permeability test, also known as Cobb Ring test, (Method 120 test developed by Technical Association of Pulp and Paper Industry, Atlanta, Ga.), determines the quantity of water absorbed by a preconditioned wood substrate (conditioned by equilibrating at 50±2% relative humidity and 23° C. ±1.1° C.), such as an OSB board, in a specified time (for at least 24 hours) under standardized conditions. The coated surface of the test substrate is exposed to 205 ml of distilled water stored inside a brass ring (10.50±0.02 cms inside diameter) with a clamp bar (ring and bar weighing 10.0±0.5 kg). The water stored inside the ring is maintained at 23°±1° C. and it produces a water head of 1.27±0.1 cm during the test period. Standardized test specimen (14.7 cms×14.7 cms) are weighed prior to and after the test to determine the water absorbed by the test specimen. More impervious the coating on the specimen, less will be the amount of water absorbed by the specimen. The water permeability results are expressed in grams of water per 645.16 square centimeters (100 square inches) absorbed by the test specimen during the test period. Thus, a theoretical reading of 1528 indicates complete water absorption and a reading of 0 indicates no water absorption by the test specimen within the test period.

The 14.7 cms×14.7 cms specimen coated with the smooth coating of the present invention were equilibrated in a 50% relative humidity at 23.8° C. conditioning room for three days prior to the Cobb test and then weighed. Triplicate measurements were made for each sample. The liquid water permeability for the OSB test specimen with no coating, i.e., a bare surface, could not be measured because the water within the test ring seeped out of the specimen within just a few minutes.

2. Adhesion Test

The coating adhesion test, also known as the Tape Adhesion test, was developed by American Hardboard Association, Palatine, Ill. to determine the strength of the adhesion of the coating to the underlying surface of a test substrate. A standardized pressure sensitive adhesion tape, which meets Federal Specification UU-T-106C (less than one year old #250 Type II pressure sensitive tape supplied by 3M Company) is affixed to the coated test surface and then abruptly pulled at 90° to the surface. No coating peeling off the substrate surface, or total delamination of the underlying substrate surface, indicates perfect adhesion, i.e., a reading of 0%. All of the coating peeling off the substrate surface indicates total failure, i.e., a reading of 100%. Portions of the coating peeling off the surface are expressed in area percentages of the peeled off the surface.

3. Surface Hardness Test

The Surface Hardness test, which meets ATM D2134-66 Standard developed by American Society of Testing Materials, Philadelphia, Pa., determines the hardness of organic coatings on the principle that the amplitude of oscillation of a rocking device decreases more rapidly on a softer surface than on a harder surface. A No. 703 Sward Type Hardness Rocker, Model No. HA-703, supplied by Paul N. Gardner Company, Inc., Pompano Beach, Fla. was used. To measure the surface hardness, the rocker is placed on a test surface and rolled to left until the bubble in the left hand vial on the rocker is in full view. The device is then released and the total number of times the bubble in the right hand vial on the rocker stays visible is counted. This number is expressed as a rocker number. Higher rocker number signifies harder underlying surface. For example, glass substrate has a rocker number of 50 and a hardboard having conventional primer coating thereon has a rocker number of 7. The rocker number of at least 2 is desirable for the coatings produced by the process of the present invention.

4. Surface Roughness Measurement

The surface roughness of the coating of the present invention was measured by DEKTAK® 3030 profilometer, supplied by Sloan Technology Corporation, Santa Barbara, Calif. DEKTAK® 3030 profilometer is a roughness tester that measures vertical features ranging in height from 131 microns to less than 100 angstroms, on a wide variety of substrate surfaces. To measure the surface roughness, a diamond-tipped stylus of the profilometer is dragged for 25.4 mms across the test surface. Surface variations cause the stylus to move up or down. Such vertical movements are averaged over the horizontal distance of 25.4 mms and displayed in micrometers as a roughness number. Higher number represents rougher surface. For example, conventional luaun plywood has a roughness number of 10.5 micrometers. Surface roughness of less than 15 micrometers is desirable for the coatings produced by the process of the present invention.

5. Hiding Test

The hiding test measures the degree to which a coating can hide or cover up the underlying surface. Colorimeter (Model no. Colorgard 1000 System) supplied by Colorgard, Silver Spring, Md. was used to measure color and color differences of the test surface to determine the degree to which a coating can hide the underlying surface. The colorimeter determines the intensity of the scattered light reflecting off a layer. By way of comparison, the intensity of the scattered light (L) for a white layer will be the highest (94.8) and the intensity of the scattered light for a black layer will be the lowest (12.4). Higher L number indicates better hiding of the test substrate surface by a coating applied on the surface.

The invention is illustrated in the following examples:
Polymer 1

Using the process for polymer 3, described below, Polymer 1 was prepared from a monomer mixture of 782 grams of butyl acrylate, 478 grams of methylmethacrylate, 460 grams of styrene, 92 grams of hydroxyethylmethacrylate, and 27.6 grams of itaconic acid. The final reaction product had a $T_g$ of 24° C.
Polymer 2

A monomer emulsion was prepared containing a total of 445 gm of deionized water, 21.4 grams of the ammonium salt of sulfated polyethoxynonylphenol, 705 grams of 2-ethylhexyl acrylate, 420 grams of styrene, 441 grams of acrylonitrile, 61 grams of methacrylic acid, 76 grams of methymethacrylate, and 38 grams of ureido functional monomer. A reactor kettle was charged with 1370 grams of deionized water and heated to 87° C. under a nitrogen. To this reactor, 17 grams of the ammonium salt of sulfated polyethoxynonylphenol, 150 grams of a monomer emulsion, and 2.6 grams of ammonium persulfate dissolved in 35 grants of water was added. The monomer emulsion along with 1.7 grams of sodium carbonate dissolved in 10 grams of water and 1.7 grams of ammonium persulfate dissolved in 10 grams of water were gradually added to the reactor. Following the addition of the monomer emulsion to the reactor, it was allowed to cool and a total of 0.024 grams of ferrous sulfate heptahydrate dissolved in 1 gram of water, 7.5 grants of 70% active tert-butylhydrogenperoxide dissolved in 30 grams of water, and 5.1 grams of sodium sulfoxylateformaldehyde dissolved in 120 grams of water were added. The final emulsion was neutralized with 17.6 gm of aqueous ammonia dissolved in 40 grams of water. Following the neutralization, 10 grams of Kathon® LX biocide (1.4% active) supplied by Rohm and Haas Company, Philadelphia, Pa. was added. The final reaction product had a solids content of 46%, a particle size of 100 nm, Tg of 30° C. and a pH of 7.5.
Polymer 3

A mixture of 1320 grams of deionized water, 3.5 grams of the ammonium salt of sulfated polyethoxynonylphenol, and 27.9 grams of itaconic acid was added to a reaction kettle and the reaction mixture was then heated to 85° C. A monomer emulsion was prepared by adding 790 grams of butyl acrylate, 449 grams of methyl methacrylate, 465 grams of styrene, 93 grams of hydroxyethyl methacrylate, 35.5 grams of allyl methacrylate and 27.5 grams of the ammonium salt of sulfated polyethoxynonylphenol to 457 grams of deionized water. To the above reaction kettle, 100 grams of the emulsion was added followed by 4.6 grams of ammonium persulfate dissolved in 30 grams of water. Within 15 minutes from the start of the reaction, the remainder of the monomer emulsion along with a solution of 2.8 grams of ammoniun persulfate dissolved in 130 grams of water was gradually added. Following the addition of the reagents, 180 grams of deionized water was added to the kettle and the kettle was allowed to cool to 60° C., at which time, 4.65 grams of a 0.15% aqueous solution of ferrous sulfate heptahydrate was added. A total of 1.8 grams of tertiary butyl hydrogen peroxide dissolved in 18.6 grams of deionized water along with 1.0 grams of sodium sulfoxylate formaldehyde dissolved in 28 grams of deionized water were added to the reaction kettle. When the reaction temperature reached 50° C., 115 grams of water, 66 grams of dimethylaminoethanol, 14.8 grams of the ammonium salt of sulfated polyethoxynonylphenol, and 245 grams of methylated polymeric melamine formaldehyde resin, used as a crosslinking agent, were added to the kettle. The latex polymer was diluted with deionized water to reach a solids content of 43.5%. The final reaction product had a pH of 9.5, $T_g$ of 28° C., a viscosity of less than 400 centipoise, and a particle size of 120 nm.

EXAMPLE 1

Separate clear polymerized latex formulations were prepared by thoroughly blending 200 parts of either Polymer 1, Polymer 2 or Polymer 3 (Polymer 1 was further mixed with 10 percent by weight of the methylated polymeric melamine formaldehyde resin as a crosslinking agent), respectively with an aqueous mixture of 5 parts of STANFAX®-320 ammonium stearate soap; 5 parts of STANFAX®-318 sulfosuccinimate surfactant soap, both supplied by Standard Adhesive & Chemical Co., Inc., Dalton, Ga.; 0.3 parts of TRITON® X-405 octyl phenoxy polyethoxy ethanol, supplied by Union Carbide Co., Charleston, W.Va. and 21 parts of water. The resulting blend was foamed with strong agitation in a KITCHENAID® blender supplied by Kitchenaid Corporation, St. Joseph, Mich. 100 grams of the latex formulation was foamed in the blender at fast speed setting for 5 to 10 minutes followed by medium speed homogenizing setting for 5 minutes to produce a foam having a foam density of 0.083 gms per milliliters. A layer of the resulting foam was spread on the surface of several 304.8 millimeters (mms)×304.8 mms oriented strand test boards (OSBs). The foamed layer on the test boards was leveled with a doctor blade to a thickness of 3.2 mms. The foamed layers were then dried in a flow controlled convection oven Model No. 1355 supplied by Hotpack Corp., Philadelphia, Pa. for 5 minutes at 121° C. The foamed layers were crushed by using a conventional heat press supplied by Wabash Company, Wabash, Wis. and cured for 1.5 minutes at a pressure of 0.48N/mm$^2$ in the press heated to a temperature of 204° C.

The coatings made from the polymerized latex emulsions which included Polymer 1, 2 or 3 were analyzed to determine their coating hardness and adhesion, which are shown in Table I below:

TABLE I

| Polymerized emulsion produced with: | Coating Hardness* | Adhesion |
|---|---|---|
| Polymer 1 | 4.7 | 0 |
| Polymer 2 | 5.1 | 0 |
| Polymer 3 | 4 | 0 |

*average of ten measurements

EXAMPLE 2

Oriented strand board test boards were provided with crushed and cured coatings made in accordance with Example 1 using Polymer 3. The cured coatings were then exposed to a postcure temperature of 177° C. for a postcure time of 0, 3, 6, and 10 minutes to determine the effect of increasing the postcure time on the coating hardness, water permeability, surface roughness and tape adhesion of the resultant coatings, which are shown below:

TABLE II

| | Surface Heating in minutes at 177° C. | | | |
|---|---|---|---|---|
| | 0 | 3 | 6 | 10 |
| Coating hardness* | 4 | 4 | 4.3 | 4.5 |
| Water permeability | 93.4 | 55.3 | 38.8 | 27.3 |
| Surface roughness** | 0.94 | 1.16 | 2.40 | 8.26 |
| Tape adhesion | 0 | 0 | 0 | 0 |

*average of ten measurements
**average vertical movement in micrometers per 25.4 mms of horizontal movement From Table II it is seen that by extending the postcure time not only coating hardness and water permeability is improved but also the surface roughness is increased.

EXAMPLE 3

A pigmented product was prepared by mixing under agitation at ambient temperature the following ingredient (percentages given in volume percent): 51.7005% of Polymer 3; 29.0187% tap water, 38% of which was used to disperse the pigment particles and 62% was used in let down; 4.7265% titanium dioxide; 3.2477% yellow iron oxide; 1.6616% calcium/magnesium silicate in the platelet form; 1.0905% hydrated aluminum silicate; 2.6478% isopropyl alcohol; 1.9883% polyolefin dispersion (micronized wax dispersed in 81% by weight isopropyl alcohol, available from Daniel Products Co., Jersey City, N.J., as "SLIP-AYD® SL-92"); 0.8394% oligomeric sodium salt solution (25% active ingredients, available from Uniroyal Chemicals Division of Uniroyal Inc., Naugatuck, Conn., as "POLY-WET®"); 0.1699% red iron oxide; 0.4996 carbon black; 0.4873% of milled polyethylene/polyfluroethylene wax (distributed by Langer and Company, Ritterhude-Ihlpohl, Germany, as "LANCO WAX™"); 0.3996% octylphenoxypolyethoxyethanol; 0.3297% urethane polymer solution (35% active on a solids basis, 65% water; available from Rohm and Haas Company, Philadelphia, Pa., as "ACRYSOL® RM8"); 0.2796% tetramethyl- 5-decyn-4,7diol/isopropanol solution (50% by weight solids, 50% by weight isopropyl alcohol, available from Air Products and Chemicals, Inc., Allentown, Pa., as "SURFYNOL® 104PA"); 0.2496% petroleum derivative defoamer (available from Henkel Corporation, Coatings and Inks Division, Ambler, Pa., as "FOAMASTER® VL); 0.2914% methanol; 0.1295% tetramethyl-5-decyn-4,7-diol; 0.1080% sodium imidazol carboxylate; 0.0429% modified hydroxyethyl cellulose (available from Aqualon Company, Wilmington, Del., as "NATROSOL® PLUS"); 0.0099% N,N-dimethylethanolamine; and 0.0040% benzisothiazolinone solution (available from ICI Americas Inc., Wilmington, Del. 8 as "PROXEL® GXL").

Hundred parts by weight of the pigmented product was then blended with 5 parts by weight of STANFAX® 320 and 5 parts by weight of STANFAX® 318 soaps and diluted with 53.5 grams of deionized (DI) water to produce a blend having a solids content of 40 percent by weight. The blend was foamed by the procedure described in Example 1. Foamed layers were spread on the surfaces of the OSB test boards and leveled with a doctor blade to a uniform thickness of 3.2 mm. The foamed layers were dried and hardened in a convection oven at 121° C. for 5 minutes. The dried foamed layers were then crushed and cured simultaneously under heat and pressure at 204° C. and 0.48N/mm$^2$, respectively through the procedure described in Example 1. The resultant coatings had smooth and void free surfaces. The coated test boards were then subjected to a heat treatment at a postcure temperature of 177° C. at varied postcure time intervals. The results are shown below:

TABLE III

| | Postcure Heating (minutes) | | | | |
|---|---|---|---|---|---|
| | 0 | 3 | 7 | 10 | 15 |
| Coating hardness* | 4.5 | 5.2 | 5.8 | 6.4 | 6.8 |
| Water permeability | 104 | 102 | 83 | 82 | 65 |
| Surface roughness** | 2.21 | 4.65 | 4.81 | 5.21 | 6.25 |
| Tape adhesion | 10 | 5 | 3 | 2 | 0 |

*average of ten measurement.
**average vertical movement in micrometers per 25.4 mms of horizontal movement From Table III it is seen that by extending the postcure heating time the coating hardness, water permeability and adhesion is improved but the surface roughness is also increased.

EXAMPLE 4

The solids content in the emulsion of Example 2 was adjusted to 50, 40, 30, and 20 percent by weight of the emulsion. Foamed layers were prepared in accordance with the method described in Examples 1 and 3. The effect of varying the solids content on the quality of the foamed layer (dried in a convection oven for 5 minutes at 121° C.) is shown below:

TABLE IV

| | Solids Content of the Emulsion | | | |
|---|---|---|---|---|
| | 20% | 30% | 40% | 50% |
| Foam Density* | 0.070 | 0.085 | 0.092 | 0.104 |
| Foam Quality** | cracks (fail) | cracks (fail) | no cracks (pass) | no cracks (pass) |

*Foam density in g/ml was determined by measuring the weight of foam divided by the weight of the water at the same volume.
**Measured after oven drying step From Table IV it is seen that by increasing the solids content in the polymerized latex emulsion and foam density, crack free foam layers can be obtained.

EXAMPLE 5

100 grams of the pigmented emulsion of Example 3 was foamed and applied on the OSB boards by the procedure described in Example 1. The foamed layers were doctored with a doctoring knife to a thickness of 3.2 mm. The boards with the foamed layers were oven-dried at various drying temperatures at various drying times to remove substantially all of the moisture. The foamed layers were then crushed in the hot press at 204° C. platen temperature for 5 minutes by the process described in Example 1. The hardness of the coatings on board specimen, was measured.

TABLE V

| | 1 | 2 | 3 | 4 | 5 | 6 | 7 |
|---|---|---|---|---|---|---|---|
| Conditions: | | | | | | | |
| Drying Temperature (°C.) | 121 | 121 | 121 | 121 | 149 | 149 | 179 |
| Drying Time (minutes) | 1 | 3 | 5 | 7 | 1 | 3 | 3 |
| Properties of the Resultant Coatings: | | | | | | | |
| Coating Hardness | 3 | 3 | 3.5 | 4 | 3.5 | 5 | 5 |

From Table V it can be seen that by increasing drying time or drying temperature coating hardness can be increased.

EXAMPLE 6

The foamed layers on the OSB test boards prepared in accordance with Example 3 were dried at 121° C. for 5 minutes and then crushed at 0.69N/mm² and 32° C. at various crushing times. The coating hardness and adhesion of the resultant coatings are shown below:

TABLE VI

| Conditions: | 1 | 2 | 3 |
|---|---|---|---|
| Crushing Time (minutes) | 0.5 | 2 | 5 |
| Properties of the Resultant Coatings: | | | |
| Coating Hardness | 3.3 | 3.4 | 3.7 |
| Tape Adhesion | 0 | 0 | 0 |

From Table VI it is seen that by extending the crushing time, the coating hardness of the resultant coating is improved without adversely affecting the adhesion of the coating to the underlying substrate.

EXAMPLE 7

Hundred parts by weight of the pigmented product of Example 3 was blended with 1.65 percent by weight of the emulsion solids of STANFAX® 320 soap, 5.7 percent by weight of the emulsion solids of STANFAX® 318 soap, 0.5 percent by weight of the emulsion solids of TRITON® X-165 foam homogenizer and 53.5 grams of DI water to produce a blend having a solids content of 40 percent by weight. The blend was foamed by a procedure described in Example 1. A foamed layer was spread on the surface of a wet/dry fiber mat specimen supplied by Temple Co., Diboll, Tex. with a doctor blade to control the thickness of the foamed layers. The foamed layers were then leveled with a doctor blade to uniform thicknesses of between 1.6 mm and 3.2 mm resulting in the add-on of 3 to 7 dry grams per 0.0929 square meter. The mats having the foamed layers were dried and hardened in the convection oven at 121° C. for 5 minutes. The dried hardened foamed layers were then crushed and cured in the hot press for 5 minutes at 204° C. and 1.93N/mm² to produce the RWS having the coatings thereon. The hidings values obtained at various add-ons are listed below:

TABLE VII

| Samples | Add-on (dry grams/sq 0.0929M) | Hiding (L value) |
|---|---|---|
| Raw board | 0 | 34.25 |
| 1 | 3.7 | 64.31 |
| 2 | 4.4 | 65.56 |
| 3 | 5.7 | 67.16 |
| 4 | 6.4 | 67.16 |

From Table VII it is seen that by increasing the add-ons, better hidings values can be obtained.

What is claimed is:

1. A reconstituted wood substrate coated with a coating produced in accordance with a method comprising:
   foaming a polymerized latex emulsion comprising:
      polymer particles of a polymer of an ethylenically unsaturated monomer, said polymer having $T_g$ in the range of 10° C. to 100° C., and
      a foaming agent;
   applying a layer of said foamed polymerized latex emulsion on the surface of said reconstituted wood substrate;
   drying said foamed layer into a hardened layer;
   crushing said hardened layer; and
   curing said crushed layer to form said coating on said reconstituted wood substrate.

2. A reconstituted wood substrate coated with a coating produced in accordance with a method comprising:
   foaming a polymerized latex emulsion comprising:
      polymer particles of a polymer of an ethylenically unsaturated monomer, said polymer having $T_g$ in the range of 10° C. to 100° C.,
      a foaming agent, and
      a foam stabilizer, said foam stabilizer being in the range of 0.1 to 15 percent by weight of emulsion solids;
   applying a layer of said foamed polymerized latex emulsion on the surface of said reconstituted wood substrate;
   drying said foamed in to a hardened layer;
   crushing said hardened layer; and
   curing said crushed layer to form said coating on said reconstituted wood substrate.

3. A reconstituted wood substrate coated with a coating produced in accordance with a method comprising:
   mixing a binder with wood particles, wood chips, wood fibers or wood flakes to form a wood/binder mix;

dispensing said wood/binder mix to produce a mat on a conveying surface;

foaming a polymerized latex emulsion comprising:
  polymer particles of a polymer of an ethylenically unsaturated monomer, said polymer having $T_g$ in the range of 10° C. to 100° C., and
  a foaming agent;

applying a foamed layer of said foamed polymerized latex emulsion on a surface of said mat;

drying said foamed layer into a hardened layer;

crushing said hardened layer; and curing said crushed layer and said mat into said coated reconstituted wood substrate.

4. A reconstituted wood substrate coated with a coating produced in accordance with a method comprising:

mixing a binder with wood particles, wood chips, wood fibers or wood flakes to form a wood/binder mix;

dispensing said wood/binder mix on a conveying surface to produce a mat;

foaming a polymerized latex emulsion comprising:
  polymer particles of a polymer of an ethylenically unsaturated monomer, said polymer having $T_g$ in the range of 10° C. to 100° C.,
  a foaming agent, and
  a foam stabilizer, said foam stabilizer being in the range of 0.1 to 15 percent by weight of emulsion solids;

applying a foamed layer of said foamed polymerized latex emulsion on a surface of said mat;

drying said foamed layer into a hardened layer;

crushing said hardened layer; and curing said crushed layer and said mat into said coated reconstituted wood substrate.

5. A reconstituted wood substrate coated with a coating produced in accordance with a method comprising:

air whipping a polymerized latex emulsion into a foam having a foam density in the range of 0.04 to 0.25 grams per milliliters, said polymerized latex emulsion comprising from 10 percent to 60 percent by weight of polymer particles of a polymer of an ethylenically unsaturated monomer and having Tg in the range of 10° C. to 100° C., from 0 percent to 40 percent by weight of emulsion solids of an aminoplast resin crosslinking agent, from 1 percent to 15 percent by weight of said emulsion solids of a foaming agent, from 0 percent to 10 percent by weight of said emulsion solids of a wetting agent, and from 0 percent to 15 percent by weight of said emulsion solids of a foam stabilizer selected from the group consisting of disodium N-octadecylsulfosuccinate, tetrasodium N-(1,2-dicarboxyethyl)-N-octadecylsulfosucdnate, sulfosuccinimate surfactant, diamyl ester of sodium sulfosuccinic acid, dihexyl ester of sodium sulfosuccinic acid, dioctyl ester of sodium sulfosuccinic acid, distearyl pyridinium chloride, N-coco-beta-aminopropionic acid and the sodium salts of said distearyl pyridinium chloride and N-coco-beta-aminopropionic acid;

applying a layer of said foamed polymerized latex emulsion on a surface of said reconstituted wood substrate to a thickness in the range of 0.8 to 10 mms;

drying said foamed layer at a drying temperature in the range of 40° C. to 180° C. for a drying time in the range of 6 hours to 30 seconds, respectively, into a hardened layer;

crushing said hardened layer at a crushing pressure in the range of 0.1 to 3.5N/mm$^2$; and curing said crushed layer at a cure temperature in the range of 24° C. to 287° C. to form said coating on said reconstituted wood substrate.

6. A reconstituted wood substrate coated with a coating produced in accordance with a method comprising:

foaming a polymerized latex emulsion comprising:
  polymer particles of a polymer of an ethylenically unsaturated monomer, said polymer having $T_g$ in the range of 10° C. to 100° C., and
  a foaming agent;

applying a layer of said foamed polymerized latex emulsion on the surface of said reconstituted wood substrate;

drying said foamed layer into a hardened layer; and simultaneously crushing and curing said hardened layer to form said coating on said reconstituted wood substrate.

7. A reconstituted wood substrate coated with a coating produced in accordance with a method comprising:

mixing a binder with wood particles, wood chips, wood fibers or wood flakes to form a wood/binder mix;

dispensing said wood/binder mix to produce a mat on a conveying surface;

foaming a polymerized latex emulsion comprising:
  polymer particles of a polymer of an ethylenically unsaturated monomer, said polymer having $T_g$ in the range of 10° C. to 100° C., and
  a foaming agent;

applying a foamed layer of said foamed polymerized latex emulsion on a surface of said mat;

drying said foamed layer into a hardened layer; and simultaneously crushing and curing said hardened layer to form a coating on said reconstituted wood substrate.

* * * * *

UNITED STATES PATENT AND TRADEMARK OFFICE
CERTIFICATE OF CORRECTION

PATENT NO. : 5,616,419
DATED : April 1, 1997
INVENTOR(S) : Oscar H. Hsu, et. al.

It is certified that error appears in the above-indentified patent and that said Letters Patent is hereby corrected as shown below:

Title page, item [57],

In the Abstract: line 5, change "orating" to coating--.

Col. 5, line 59, insert a comma after "surfactant"; and

Col. 8, line 29, change "discreetly" to --discretely--.

Claim 5, col. 17, line 52, change "N-octadecylsulfosucdnate" to --N-octadecylsulfosuccinate--.

Signed and Sealed this

Eighteenth Day of November 1997

Attest:

BRUCE LEHMAN

Attesting Officer

Commissioner of Patents and Trademarks